United States Patent [19]

Beal

[11] Patent Number: 4,717,430

[45] Date of Patent: Jan. 5, 1988

[54] SOLDERING COMPOSITIONS, FLUXES AND METHODS OF USE

[75] Inventor: Roy E. Beal, Scottsdale, Ariz.

[73] Assignee: Copper Development Association, Inc., Birmingham, Mich.

[21] Appl. No.: 924,308

[22] Filed: Oct. 29, 1986

Related U.S. Application Data

[62] Division of Ser. No. 621,674, Jun. 18, 1984, Pat. No. 4,647,308.

[51] Int. Cl.$^4$ .............................................. B23K 35/34
[52] U.S. Cl. ...................................... 148/24; 148/26; 420/513; 420/514; 420/515
[58] Field of Search ................................. 148/24, 26; 420/513–515

[56] References Cited

U.S. PATENT DOCUMENTS

| 3,480,465 | 11/1969 | Imabayashi | 420/514 |
| 3,527,601 | 9/1970 | Foorster | 75/178 |
| 3,615,379 | 10/1971 | Pelzel | 420/515 |
| 3,785,811 | 1/1974 | Pelzel | 420/514 |
| 3,858,319 | 1/1975 | Stokes, Jr. et al. | 29/496 |
| 4,610,937 | 9/1986 | Ito | 420/514 |

FOREIGN PATENT DOCUMENTS 846899 1/1977 Belgium .
1817041 7/1970 Fed. Rep. of Germany .
2079017 11/1971 France .

*Primary Examiner*—Peter D. Rosenberg
*Attorney, Agent, or Firm*—Leydig, Voit & Mayer

[57] ABSTRACT

A method of joining metal surfaces is provided which comprises contacting the metal surfaces with a zinc-based composition and joining the metal surfaces, the zinc-based composition comprising, by weight:
from about 0.1 to about 4 percent copper;
from about 0.1 to about 1 percent nickel;
from about 0.01 to less than 0.5 percent aluminum;
0 to about 0.5 percent chromium;
0 to about 0.5 percent titanium; and the remainder being zinc is also provided. The composition is useful for coating metal surfaces, particularly metals formed of or containing copper.

The above composition and method may be used with or without a flux. Particularly beneficial results are obtained when a flux having a composition comprising, by weight:
from about 5 to about 70 percent $ZnCl_2$;
from about 1 to about 28 percent $NH_4Cl$;
from about 0.1 to about 10 percent $SnCl_2$;
from about 0 to about 10 percent HCl;
from about 0 to about 10 percent $Li_2B_4O_7$;
from about 0 to about 5 percent $MgBr_2$;
from about 0 to about 5 percent $ZnBr_2$; and about 0 to about 94 percent water is used.

21 Claims, No Drawings

SOLDERING COMPOSITIONS, FLUXES AND METHODS OF USE

This application is a division of application Ser. No. 621,674, filed June 18, 1984, now U.S. Pat. No. 4,647,308.

TECHNICAL FIELD

This invention relates to a zinc-based composition for coating or joining metal surfaces. More specifically, the present invention relates to a zinc-based composition having greatest applicability as a composition for coating or joining copper or copper alloy surfaces and to methods related to such usage.

The present invention is also directed to a composition suitable for use as a flux, notably in treating surfaces of metals, particularly in association with the zinc-based compositions of the present invention.

BACKGROUND ART

Traditionally, copper and copper alloys have been joined by use of lead-tin or lead-tin-silver solders. The high cost and density of these types of solders, which are used extensively in automobile and truck radiators, have encouraged the search for suitable alternatives. A further drawback is their limited mechanical strength which further decreases as temperature increases.

An object of this invention is to provide an alternative to these conventional solders which is highly effective in joining copper and copper alloys, which is reasonable in cost, and which maintains its strength over a range of temperatures appropriate to radiator operation. Additionally, the zinc-based compositions of this invention readily wet and flow over copper and copper alloys surfaces during the joining operation and have reduced dissolving activity or reactivity vis-a-vis conventional zinc alloys.

DISCLOSURE OF INVENTION

The present invention is directed to a zinc-based composition comprised, by weight, of:
from about 0.1 to about 4.0 percent copper;
from about 0.1 to about 1.0 percent nickel;
from about 0.01 to less than 0.5 percent aluminum;
0 to about 0.5 percent chromium;
0 to about 0.5 percent titanium;
and the remainder being zinc.

The zinc-based compositions of the present invention may be used to coat or plate metal surfaces but are primarily intended as filler materials in joining metal surfaces by a process of coalescence, such as soldering or brazing. The filler metal may also be used in a fusion process or welding of materials. The compositions of the instant invention are particularly useful for soldering or joining the surfaces of copper-containing metals. The term "copper-containing metals", as used herein, means copper and copper alloys, such as brass or the like. As a result, these compositions are well adapted to the manufacture and repair of automobile and truck radiators. They also find application in joining copper and copper alloy surfaces for plumbing pipe, in electrical motors and generators and in electronic modules such as printed circuits.

The zinc-based compositions of the present invention are currently substantially more economical than conventional lead/tin and lead/tin/silver solders. The compositions of the present invention exhibit a controlled reaction with copper-containing surfaces. These compositions also exhibit improved conductivity with concomitant improved characteristics in electrical circuitry. In addition, the compositions of the present invention show good corrosion resistance at elevated temperatures when exposed to the commonly employed engine coolants. Finally, the instant alloys provide high tensile strength when used as filler materials. These last mentioned characteristics render the compositions ideally suited for the manufacture and repair of vehicular engine radiators.

The present invention also contemplates a composition useful as a flux and suitable for cleaning metal surfaces prior to subsequent surface treatments such as the application of a coating or cladding or plating on a metal surface or joining one metal surface to another by means of a filler in a coalescent process, such as soldering or brazing. A preferred flux composition of the present invention comprises, by weight:
from about 5 to about 70 percent $ZnCl_2$;
from about 1 to about 28 percent $NH_4Cl$;
from about 0.1 to about 10 percent $SnCl_2$;
from about 0 to about 10 percent $HCl$;
from about 0 to about 10 percent $Li_2B_4O_7$;
from about 0 to about 5 percent $MgBr_2$;
from about 0 to about 5 percent $ZnBr_2$; and from about 0 to about 94 percent water.

These flux compositions are most suited to soldering operations in which copper-containing surfaces, particularly brass surfaces, are joined, particularly when employing the zinc compositions of the present invention. When used in combination with those zinc-based compositions, the flux compositions of the present invention exhibit improved effectiveness in rendering copper containing surfaces wettable by the soldering compositions. Thus, the combination of the flux compositions and the zinc-based compositions of the present invention provides a system for joining metal surfaces, particularly copper-containing metal surfaces, which is superior to other systems known heretofore.

The present invention is also directed to a process for using the above-described zinc-based compositions to coat, plate, clad or join metal surfaces, particularly those formed from copper-containing materials.

The present invention further contemplates articles of manufacture in which at least one metal surface, particularly a copper-containing surface, is bonded to the zinc-based compositions of the present invention. This includes both articles in which a metallic surface is coated, clad or plated with the instant zinc compositions or those articles in which two metal surfaces are bonded to one another with the instant zinc-based compositions being used as a filler material in soldering, brazing or welding.

BEST MODES FOR CARRYING OUT THE INVENTION

The zinc-based compositions of the present invention, as outlined above and described in greater detail below, are useful in joining or soldering copper-containing materials, i.e., copper or copper alloy materials. Other than zinc, the filler and coating compositions of the present invention include, as basic components, copper, nickel and aluminum. Additionally, these compositions may, and preferably do, contain small amounts of chromium and/or titanium, which enhance the properties of these compositions in their tendency to reduce the reactivity of the compositions with copper-containing metal surfaces.

While not fully accounting for all of the unique and synergistic properties of the present composition, some of the properties may be attributable, at least in part, to individual components. Thus, the copper in the composition tends to minimize reaction of other components of the composition with the copper in the surface of the article being soldered or filled. Nickel improves the corrosion resistance of the composition. Chromium and titanium not only reduce the rate of solution of copper or copper alloys in zinc and thereby facilitate soldering but also increase the strength of the alloy composition and, in conjunction with copper and nickel, produce a strong, effective soldered joint.

The following percentages, by weight, are suitable for the ranges of components of the zinc-based compositions of the present invention:

from about 0.1 to about 4.0 percent copper, preferably from about 0.1 to about 3.2 percent and most preferably from about 2.0 to about 3.0 percent;

from about 0.1 to about 1.0 percent nickel, preferably from about 0.1 to about 0.5 percent and most preferably from about 0.2 to about 0.25 perent;

from about 0.01 to less than 0.5 percent aluminum, preferably from about 0.02 to about 0.3 percent and most preferably from about 0.05 to about 0.2 percent;

0 to about 0.5 percent chromium, preferably from about 0.1 to about 0.5 percent and most preferably from about 0.15 to about 0.25 percent;

0 to about 0.5 percent titanium, preferably from about 0.1 to about 0.5 percent and most preferably from about 0.15 to about 0.25 percent; and the remainder being zinc.

Set forth immediately below are several preferred zinc-based compositions of the present invention found to be most useful as filler or soldering compositions. These compositions, although having application generally as soldering, brazing or filler compositions for copper based metals, are particularly suited for the assembly and repair of automotive type radiators, such as in tank-to-header joints, tube-to-header joints, and tube-to-fin joints. The preferred compositions are, by weight:

Composition 1 copper—2.8 to 3.2 percent
nickel—0.2 to 0.5 percent
aluminum—0.05 to 0.15 percent
chromium—0.2 to 0.5 percent
titanium—0.2 to 0.5 percent
zinc—balance;

Composition 2 copper—2.5 to 3.0 percent
nickel—0.2 to 0.25 percent
aluminum—0.05 to 0.10 percent
chromium—0.15 to 0.25 percent
titanium—0.15 to 0.25 percent
zinc—balance;

Composition 3 copper—0.1 to 0.2 percent
nickel—0.2 to 0.25 percent
aluminum—0.02 to 0.10 percent
chromium—0.15 to 0.25 percent
titanium—0.15 to 0.25 percent
zinc—balance.

The American Welding Society uses a melting temperature of the filler material of 840 degrees F. to distinguish soldering from brazing processes. Many of the zinc compositions of the present invention melt in the range of 800–850 degrees F. and may, therefore, be identified as filler materials for soldering or brazing techniques, or fusion processes generally, which also includes welding techniques. Most, however, melt at or below 840 degrees F. and may be classified as soldering compositions.

These zinc-based compositions, though ideally suited as filler materials in soldering and brazing processes, particularly in joining copper-containing materials, are not limited only to such uses. In view of the affinity for metals which these zinc-based compositions demonstrate, they also may be used as materials to effect a treatment of metal surfaces, particularly copper-containing metal surfaces, which results in a coating, plating or cladding on the metal surface. These surface treatments may generally be accomplished, as the joining procedures may be, by conventional techniques. These processes generally require the zinc-based compositions to be in the molten state. However, in some techniques, such as a strip cladding process, the zinc-based composition may be applied to the metal surface by pressure and the thickness of the cladding is then reduced by rolling.

As described above, the properties of the zinc-based compositions of the present invention are superior to known zinc-based solder materials. Compositions (1) and (2) above provide tensile strengths of about 24,000 psi and Composition (3) provides a tensile strength of 15,000 psi using standard ASTM testing procedures. Furthermore, the magnitude of these tensile properties are retained at temperatures of as high as at least 250 degrees F. In addition, Composition 2 provides very good stress-rupture strength properties, specifically a life-to-rupture of 10,000 hours at a 12,500 psi stress.

When joined to brass as a solder, the zinc-based compositions of the present invention produced a strength, as determined by peeling tests, within the range of from 40 to 80 pounds per inch, using a 0.005 inch thick brass base material at room temperature. This test involves the formation of a cast portion of the zinc composition bonded to and within the arch or notch formed in a U- or V-shaped strip of brass. A load is thereafter applied to the two ends of the strip sufficient to sever or peel the composition from the surface of the brass. The load required to peel the composition from the brass surface is a measure of the strength of the bond formed.

Elevated temperature tests in conventional engine coolant (ethylene glycol) have established a preferred composition for service life in a radiator environment, corresponding to Composition 2 above. Stress rupture tests at 8 pounds per inch produce up to a 4,000 hour life at 200 degrees F. in 50 percent v/v ethylene glycol engine coolant with the new zinc alloy solder.

Automotive Radiator Tests

In a separate set of tests, the performance of zinc-based solder Composition 2, set forth above, was compared with that of a conventional tin-lead-silver (2.5 percent Sn, 0.5 percent Ag, 97 percent Pb) solder used to seal seams in automotive radiators. The similarly manufactured radiators were compared on a simulated service test stand. The test procedure involved a dynamic program in which a thermal cycling period from 180 degrees F. to 230 degrees F. in a 15 minute heating period was performed, followed by a 5 minute cooling cycle to 180 degrees F. A superimposed pressure cycle was also performed in which the pressure was increased from atmospheric to a prescribed pressure for 4 minutes and returned to atmospheric pressure for another 4 minute period. The simulated service test has proven valid over many years. Summarized in Table I are the lifetimes of joints formed with conventional tin-lead-silver soldering compositions compared with those formed with the above-mentioned zinc-based solder Composition 2 of this invention which includes, by weight, 3.0 percent copper, 0.2 percent nickel, 0.1 percent aluminum, 0.2 percent chromium, 0.2 percent titanium and the remainder zinc.

TABLE I

| Upper Limit of Pressure Cycle | Conventional tin-lead-silver solder | Zinc-based solder Composition 2 |
| --- | --- | --- |
| 25 psig | 600 hours | 2,000 hours |
| 20 psig | 1,800 hours | over 3,000 hours |

The above results provide strong evidence of the superiority of the zinc-based compositions of the present invention as compared to conventional tin-lead-silver solders when applied to the manufacture of automotive radiators. It should be noted that, when failures occurred in those radiators maintained at 20 psig, which were soldered with a zinc composition of the present invention, the fractures which developed were not in the soldered joints themselves but in the brass metal of the radiator component adjacent the soldered area.

These zinc-based compositions may be used as either physical mixtures or as alloy compositions. Thus, the metal components may be prepared in powder or comminuted form individually or, for example, as 2 or 3 component alloys, and thereafter blended to form a heterogeneous mixture of the desired composition, a portion of which may be melted when used. Alternatively, all of the metal components may be combined in either the solid or molten state and mixed in the molten state to form a homogeneous mixture or alloy and thereafter formed into any convenient shape, such as bar, wire, rod, sheet, ribbon, foil, etcetera, for subsequent use.

When formed as alloys, the zinc-based compositions of the present invention can be prepared by a straightforward melting operation. Preferably, induction melting is used because it provides improved mixing. The melting operation is also preferably carried out under an inert atmosphere, e.g., a nitrogen or argon blanket, to avoid oxidation of the component metals, particularly titanium. A nominal temperature in the range of from about 850 degrees 1,200 degrees F. is typically reached during the melting operation; preferably the higher temperatures in this range are used to expedite melting and mixing of the components.

Fluxes

The zinc-based compositions of the present invention can be used to coat, plate, clad, join or fill metal surfaces, particularly copper-containing surfaces, using conventional joining techniques and the flux of the present invention. The zinc-based compositions of the instant invention can also be used in some situations in the absence of any flux. For example, a molten bath of a zinc-based composition of this invention can be prepared and the copper-containing surfaces to be coated placed in the bath and an ultrasonic field applied. If several metal surfaces are to be joined, they may be placed in the bath in close proximity or in contact with one another. Ultrasonic cavitation in the molten composition removes oxide from the parts and allows the composition to coat the clean surfaces.

Similarly, copper-containing metal surfaces can be coated or joined without the use of a flux by placing the zinc-based composition, as, for example, in the form of a sheet, ribbon, foil, ring or preform, between the surfaces to be joined and in contact therewith or simply on a surface to be coated. The zinc-based composition is then heated by any suitable means to melt it and allow it to wet the surfaces to be joined. Upon cooling, a solid coating or joint with substantial strength is formed. When this procedure is employed, the heating step is often carried out under a reducing atmosphere, for example, by using an inert gas (such as nitrogen) blanket containing a minor amount (e.g., 5 percent) of hydrogen. Additionally, the inert gas should have a low dew point, i.e., a low water vapor content. Alternatively, resistance brazing may be used requiring no inert gas atmosphere.

As indicated above, the zinc-based compositions of the present invention, when employed as a filler material, may be used with the flux of the present invention. To be suitable for use with the zinc-based compositions of the present invention as a solder material, the flux must clean the surfaces to be coated or joined, protect the surfaces and solder from oxidation during heating, melt and flow at a temperature below that at which the solder alloy melts, flow and wet the surfaces when molten, and assist the solder in spreading over the surfaces of the base metal.

Preferred for use with the zinc-based compositions of the present invention are those fluxes which contain one or more halide components, e.g., a bromide or a chloride as an acid or salt. Silver or tin may also be present in the flux, either as fine particles of the elemental metal or as soluble salts, such as chlorides, bromides, etcetera A metal surface treatment material or flux which satisfies all of the above-enumerated properties of a preferred flux and which results in superior bonding of zinc-based alloys to metal surfaces, particularly copper-containing surfaces, comprises, by weight, the following composition:

from about 5 to about 70 percent $ZnCl_2$;
from about 1 to about 28 percent $NH_4Cl$;
from about 0.1 to about 10 percent $SnCl_2$;
from about 0 to about 10 percent HCl;
from about 0 to about 10 percent $Li_2B_4O_7$;
from about 0 to about 5 percent $MgBr_2$;
from about 0 to about 5 percent $ZnBr_2$;
and from about 0 to about 94 percent water.

This composition may be used as a dilute aqueous solution or in more concentrated form, including a direct mixture of the dry salts. The preferred range is from about 6 percent salt content to almost 100 percent salts, as a paste and a composition which is most preferred is an aqueous solution containing about 15 percent, by weight, of salts. The terms "salt", "salts", or the like, as used herein, referring to the components of the flux of the present invention, are also intended to include HCl.

A preferred form of this flux composition is one having the following composition, comprising, by weight:
about 10 percent $ZnCl_2$;
about 3.8 percent $NH_4Cl$;

about 1.5 percent $SnCl_2$;
about 5 percent HCl;
about 0.5 percent $Li_2B_4O_7$;
about 0.5 percent $MgBr_2$;
about 0.5 percent $ZnBr_2$;
and the remainder being water.

These metal surface treatment or flux compositions may be introduced to the metal surface to be treated separately from or concurrently with zinc-based compositions. That is, they may be introduced in separate steps or the zinc-based composition may be provided in a suitable form, such as a rod, wire or bar, having a core or, more preferably, generally with a suitable binder, a coating of flux thereon. Articles of this type permit the zinc-based composition and flux to contact the metal surface at about the same time.

It should be understood that the invention is susceptible to various modifications and alternative forms and embodiments and that the particular forms, modifications and embodiments described herein are not intended to limit the invention but rather the invention is to cover all modifications, equivalents and alternatives falling within the spirit and scope of the invention as expressed in the appended claims. As but one example, commercial grade metals may, for certain uses, e.g., the joining of radiator parts, be perfectly satisfactory. However, for applications where high and uniform conductivity is important as, for example, in soldering electrical components, it may be necessary to employ more highly refined and purified metals in preparing the compositions of the subject invention.

I claim:

1. A method of joining metal surfacses comprising contacting said metal surfaces with a zinc-based filler composition and joining said metal surfaces, said zinc-based filler composition comprising, by weight:
   from about 0.1 to about 4.0 percent copper;
   from about 0.1 to about 1.0 percent nickel;
   from about 0.01 to less than 0.5 percent aluminum;
   0 to about 0.5 percent chromium;
   0 to about 0.5 percent titanium; and the remainder being zinc.

2. The method of claim 1 wherein said metal surfaces comprise copper-containing metal surfaces.

3. The method of claim 2 wherein said metal surfaces are treated with a flux composition.

4. The method of claim 3 wherein said flux composition comprises, by weight:
   from about 5 to about 70 percent $ZnCl_2$;
   from about 1 to about 28 percent $NH_4Cl$;
   from about 0.1 to about 10 percent $SnCl_2$;
   from about 0 to about 10 percent HCl;
   from about 0 to about 10 percent $Li_2B_4O_7$;
   from about 0 to about 5 percent $MgBr_2$;
   from about 0 to about 5 percent $ZnBr_2$;
   and from about 0 to about 94 percent water.

5. The method of claim 2 wherein said zinc-based filler composition comprises, by weight:
   2.8 to 3.2 percent copper;
   0.2 to 0.5 percent nickel;
   0.05 to 0.15 percent aluminum;
   0.2 to 0.5 percent chromium;
   0.2 to 0.5 percent titanium; and the remainder being zinc.

6. The method of claim 2 wherein said zinc-based filler composition comprises, by weight:
   2.5 to 3.0 percent copper;
   0.2 to 0.25 percent nickel;
   0.05 to 0.10 percent aluminum;
   0.15 to 0.25 percent chromium;
   0.15 to 0.25 percent titanium; and the remainder being zinc.

7. The method of claim 2 wherein said zinc-based filler composition comprises, by weight:
   0.1 to 0.2 percent copper;
   0.2 to 0.25 percent nickel;
   0.02 to 0.10 percent aluminum;
   0.15 to 0.25 percent chromium;
   0.15 to 0.25 percent titanium; and the remainder being zinc.

8. The method of claim 4 wherein said flux comprises, by weight:
   10 percent $ZnCl_2$;
   3.8 percent $NH_4Cl$;
   1.5 percent $SnCl_2$;
   5.0 percent HCl;
   0.5 percent $Li_2B_4O_7$;
   0.5 percent $MgBr_2$;
   0.5 percent $ZnBr_2$; and the remainder being water.

9. A method of coating a metal surface comprising contacting said metal surface with a zinc-based composition comprising, by weight:
   from about 0.1 to about 4.0 percent copper;
   from about 0.1 to about 1.0 percent nickel;
   from about 0.01 to less than 0.5 percent aluminum;
   0 to about 0.5 percent chromium;
   0 to about 0.5 percent titanium; and the remainder being zinc.

10. The method of claim 9 wherein said metal surface comprises a copper-containing metal surface.

11. The method of claim 10 wherein said metal surface is treated with a flux composition.

12. The method of claim 11 wherein said flux composition comprises, by weight:
    from about 5 to about 70 percent $ZnCl_2$;
    from about 1 to about 28 percent $NH_4Cl$;
    from about 0.1 to about 10 percent $SnCl_2$;
    from about 0 to about 10 percent HCl;
    from about 0 to about 10 percent $Li_2B_4O_7$;
    from about 0 to about 5 percent $MgBr_2$;
    from about 0 to about 5 percent $ZnBr_2$;
    and from about 0 to about 94 percent water.

13. The method of claim 10 wherein said zinc-based filler composition comprises, by weight:
    2.8 to 3.2 percent copper;
    0.2 to 0.5 percent nickel;
    0.05 to 0.15 percent aluminum;
    0.2 to 0.5 percent chromium;
    0.2 to 0.5 percent titanium; and the remainder being zinc.

14. The method of claim 10 wherein said zinc-based filler composition comprises, by weight:
    2.5 to 3.0 percent copper;
    0.2 to 0.25 percent nickel;
    0.05 to 0.10 percent aluminum;
    0.15 to 0.25 percent chromium;
    0.15 to 0.25 percent titanium; and the remainder being zinc.

15. The method of claim 10 wherein said zinc-based filler composition comprises, by weight:
    0.1 to 0.2 percent copper;
    0.2 to 0.25 percent nickel;
    0.02 to 0.10 percent aluminum;
    0.15 to 0.25 percent chromium;
    0.15 to 0.25 percent titanium; and the remainder being zinc.

16. The method of claim 12 wherein said flux composition comprises, by weight:
10 percent $ZnCl_2$;
3.8 percent $NH_4Cl$;
1.5 percent $SnCl_2$;
5.0 percent HCl;
0.5 percent $Li_2B_4O_7$;
0.5 percent $MgBr_2$;
0.5 percent $ZnBr_2$; and the remainder being water.

17. A metod of adhering a zinc-based composition to a metal surface comprising contacting said metal surface with a composition comprising, by weight:
from about 0.1 to about 4.0 percent copper;
from about 0.1 to about 1.0 percent nickel;
from about 0.01 to less than 0.5 percent aluminum;
0 to about 0.5 percent chromium;
0 to about 0.5 percent titanium; and
the remainder being zinc.

18. The method of claim 2, wherein titanium is present in an amount of 0.10 to about 0.5% by weight.

19. The method of claim 9, wherein titanium is present in an amount of 0.1 to about 0.5% by weight.

20. The method of claim 17, wherein titanium is present in an amount of 0.1 to about 5% by weight 21. A method of joining metal surfaces comprising contacting said metal surfaces with a zinc-based filler composition and joining said metal surfaces, said zinc-based filler composition comprising, by weight:
from about 0.1 to about 4.0 percent copper;
from about 0.1 to about 1.0 percent nickel;
from about 0.01 to less than 0.5 percent aluminum;
0 to about 0.5 percent chromium;
0.1 to about 0.5 percent titanium; and
the remainder being zinc.

* * * * *